US009424623B2

(12) United States Patent
Yonemoto et al.

(10) Patent No.: US 9,424,623 B2
(45) Date of Patent: Aug. 23, 2016

(54) IMAGE PROCESSOR

(71) Applicant: OLYMPUS CORPORATION, Tokyo (JP)

(72) Inventors: Tomonori Yonemoto, Tokyo (JP); Hideru Ikeda, Tokyo (JP); Naoto Funakoshi, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 14/747,738

(22) Filed: Jun. 23, 2015

(65) Prior Publication Data

US 2015/0379675 A1 Dec. 31, 2015

(30) Foreign Application Priority Data

Jun. 26, 2014 (JP) ................................. 2014-131261

(51) Int. Cl.
*G06K 9/56* (2006.01)
*G06T 1/20* (2006.01)
*H04N 5/232* (2006.01)

(52) U.S. Cl.
CPC .............. *G06T 1/20* (2013.01); *H04N 5/23241* (2013.01)

(58) Field of Classification Search
None
See application file for complete search history.

(56) References Cited

U.S. PATENT DOCUMENTS

| | | | | |
|---|---|---|---|---|
| 5,448,655 A | * | 9/1995 | Yamaguchi | ............... G06T 1/20 382/193 |
| 2011/0222121 A1 | * | 9/2011 | Odamaki | .................. G06T 1/20 358/1.16 |

FOREIGN PATENT DOCUMENTS

JP         2004-330562        11/2004

* cited by examiner

*Primary Examiner* — Stephen R Koziol
*Assistant Examiner* — Amandeep Saini
(74) *Attorney, Agent, or Firm* — Pillsbury Winthrop Shaw Pittman, LLP (57) ABSTRACT

An image processor includes: a first division control information acquiring circuit configured to acquire division control information of a first chip; a second division control information acquiring circuit configured to acquire division control information of a second chip; a division process control circuit configured to determine a ratio at which a process is performed by the first image processing circuit and a ratio at which a process is performed by the second image processing circuit, based on the division control information of the first chip and the division control information of the second chip; a division circuit configured to divide data to be subjected to image processing into first-chip data and second-chip data at the determined ratios; the first image processing circuit configured to perform image processing on the first-chip data; and the second image processing circuit configured to perform image processing on the second-chip data.

7 Claims, 4 Drawing Sheets

IMAGE PROCESSOR

BACKGROUND OF THE INVENTION

1. Field of the Invention

The present invention relates to an image processor.

Priority is claimed on Japanese Patent Application No. 2014-131261, filed Jun. 26, 2014, the content of which is incorporated herein by reference.

2. Description of Related Art

With improvements in functionality and performance of cameras, it has become difficult to perform an imaging process in a camera satisfactorily using only a single application specific integrated circuit (ASIC, a chip). In order to solve this problem, a method of dividing an imaging process using two ASICs is known. For example, when a moving image with a resolution of 4 k×2 k and a frame rate of 30 fps is processed, a processing area is vertically or horizontally divided and divided areas are processed in parallel using the ASICs. Accordingly, it is possible to perform an imaging process on a moving image with a high resolution and a high frame rate.

On the other hand, along with the improvements in functionality and performance of cameras, there are problems in that power consumption increases and heat is emitted from a camera body due to the increase in power consumption. Accordingly, when an imaging process is performed using two ASICs, it is necessary to divide a processing area to avoid raising the temperature in the body due to biasing of a processing load to one ASIC.

However, the condition of temperature rise of each ASIC varies depending on the shape of the camera body or the mounting conditions such as arrangement of the ASICs on a substrate. If image processing is not performed under the same image processing conditions when the divided image processing is performed using the ASICs, the processing results differ and thus it is necessary to set the image processing conditions in the plural ASICs to be the same.

A control method of stopping an operation of a device when a temperature value read by a temperature sensor is equal to or higher than a predetermined threshold value and operating the device in a low-power mode so as to prevent the operation from stopping due to a temperature rise when the temperature value read by the temperature sensor is equal to or higher than a predetermined second threshold value is known (for example, see Japanese Unexamined Patent Application, First Publication No. 2004-330562).

SUMMARY OF THE INVENTION

According to a first aspect of the present invention, an image processor includes: a first division control information acquiring circuit configured to acquire division control information of a first chip having a first image processing circuit; a second division control information acquiring circuit configured to acquire division control information of a second chip having a second image processing circuit; a division process control circuit configured to determine a ratio at which a process is performed by the first image processing circuit and a ratio at which a process is performed by the second image processing circuit, based on the division control information of the first chip and the division control information of the second chip; a division circuit configured to divide data to be subjected to image processing into first-chip data and second-chip data at the ratios determined by the division process control circuit; the first image processing circuit configured to perform image processing on the first-chip data; and the second image processing circuit configured to perform image processing on the second-chip data.

According to a second aspect of the present invention, the image processor according to the first aspect of the present invention may further include a display processing circuit configured to generate the data to be subjected to image processing on which the image processing has been performed, based on the first-chip data subjected to the image processing by the first image processing circuit and the second-chip data subjected to the image processing by the second image processing circuit.

According to a third aspect of the present invention, in the image processor according to the first or second aspect of the present invention, the division control information of the first chip may be a temperature of the first chip. The division control information of the second chip may be a temperature of the second chip.

According to a fourth aspect of the present invention, in the image processor according to the first or second aspect of the present invention, the division control information of the first chip may be an amount of data transferred through an internal bus of the first chip. The division control information of the second chip may be an amount of data transferred through an internal bus of the second chip.

According to a fifth aspect of the present invention, in the image processor according to the first or second aspect of the present invention, the division control information of the first chip may be an internal processing time of the first chip. The division control information of the second chip may be an internal processing time of the second chip.

DETAILED DESCRIPTION OF THE INVENTION

Hereinafter, an embodiment of the present invention will be described with reference to the accompanying drawings.

Figure 1:
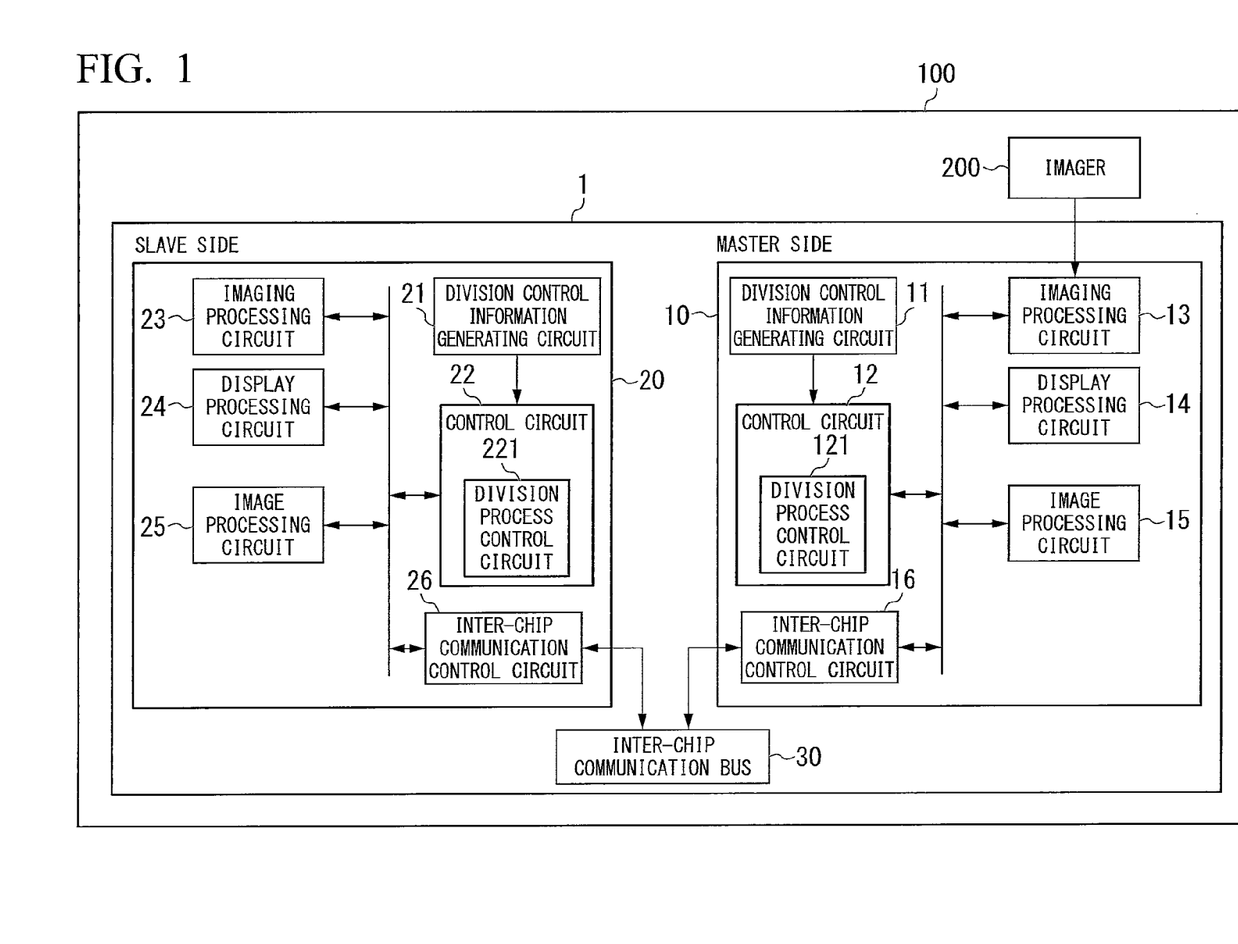
FIG. 1 is a block diagram illustrating a configuration of an imaging device according to an embodiment of the present invention.

First, a configuration of an image processing apparatus will be described. FIG. 1 is a block diagram illustrating a configuration of an imaging device according to the embodiment. In the illustrated example, an imaging device 100 includes an imager 200 and an image processor 1. The image processor 1 includes a master chip 10 (first chip), a slave chip 20 (second chip), and an inter-chip communication bus 30. The master chip 10 and the slave chip 20 are application specific integrated circuits (ASICs, chips). Accordingly, in the illustrated example, the image processor 1 includes two ASICs. The imager 200 is a complementary metal oxide semiconductor (CMOS) image sensor or a charge coupled device (CCD) image sensor, and converts light into an electrical signal and outputs the electrical signal.

The master chip 10 can function as a division control information generating circuit 11 (first division control information acquiring circuit), a control circuit 12, an imaging processing circuit 13 (division circuit), a display processing circuit 14, an image processing circuit 15 (first image processing circuit), and an inter-chip communication control circuit 16. The slave chip 20 can function as a division control information generating circuit 21 (second division control information acquiring circuit), a control circuit 22, an imaging processing circuit 23, a display processing circuit 24, an image processing circuit 25 (second image processing circuit), and an inter-chip communication control circuit 26. In this way, in the embodiment, the master chip 10 and the slave chip 20 have the same configuration.

The division control information generating circuit 11 acquires division control information of the master chip 10. The division control information generating circuit 21 acquires division control information of the slave chip 20. The division control information is, for example, internal temperatures of the master chip 10 and the slave chip 20. When the division control information is the internal temperatures of the master chip 10 and the slave chip 20, the division control information generating circuit 11 includes a temperature sensor and acquires the internal temperature of the master chip 10. The division control information generating circuit 21 includes a temperature sensor and acquires the internal temperature of the slave chip 20.

The control circuit 12 controls the master chip 10. The control circuit 22 controls the slave chip 20. The control circuit 12 functions as a division process control circuit 121. The division process control circuit 121 determines a data processing ratio between the master chip 10 and the slave chip 20 based on the division control information of the master chip 10 and the division control information of the slave chip 20. The method of determining the data processing ratio will be described later. In the embodiment, the control circuit 22 can also function as the division control information generating circuit 21.

The imaging processing circuit 13 generates image data based on an electrical signal output from the imager 200. The imaging processing circuit 13 divides the image data into master-chip data (first-chip data) and slave-chip data (second-chip data) based on the data processing ratio between the master chip 10 and the slave chip 20 which is determined by the division process control circuit 121. The division method will be described later. The imaging processing circuit 13 outputs the master-chip data to the image processing circuit 15 of the master chip 10. The imaging processing circuit 13 outputs the slave-chip data to the image processing circuit 25 of the slave chip 20. In the embodiment, the imaging processing circuit 23 may perform the same processes as the imaging processing circuit 13, but the imaging processing circuit 23 does not actually perform any particular process.

The image processing circuit 15 performs image processing on the master-chip data input from the imaging processing circuit 13. The image processing circuit 25 performs image processing on the slave-chip data input from the imaging processing circuit 13. Details of the image processing which is performed by the image processing circuit 15 and the image processing circuit 25 are the same and parameters used for the image processing are the same.

For example, the same parameters used for the image processing may be set in advance in the image processing circuit 15 and the image processing circuit 25. For example, the same parameters may be used by transmitting the parameters used for the image processing from the image processing circuit 15 to the image processing circuit 25. For example, the same parameters may be used by transmitting the parameters used for the image processing from the image processing circuit 25 to the image processing circuit 15. The image processing which is performed by the image processing circuit 15 and the image processing circuit 25 may be any process. For example, the image processing circuit 15 and the image processing circuit 25 may perform a noise removing process as the image processing.

The display processing circuit 14 performs display processing on a combination of the data which has been processed by the image processing circuit 15 of the master chip 10 and the image processing circuit 25 of the slave chip 20. In the embodiment, the display processing circuit 24 may perform the same process as the display processing circuit 14, but the display processing circuit 24 does not actually perform any particular process.

The inter-chip communication control circuit 16 is connected to the inter-chip communication bus 30 and can transmit and receive data. The inter-chip communication control circuit 26 is connected to the inter-chip communication bus 30 and can transmit and receive data. The inter-chip communication bus 30 is a data transmission line. Accordingly, the master chip 10 and the slave chip 20 can transmit and receive data to and from each other via the inter-chip communication control circuits 16 and 26 and the inter-chip communication bus 30.

The method, which is performed by the division process control circuit 121, of determining the data processing ratio between the master chip 10 and the slave chip 20 will be described next. In the embodiment, the master chip 10 determines the data processing ratio between the master chip 10 and the slave chip 20 based on the internal temperature of the master chip 10 acquired by the division control information generating circuit 11 and the internal temperature of the slave chip 20 acquired by the division control information generating circuit 21.

Hereinafter, the internal temperature of the master chip 10 is defined as $T_m$. The internal temperature of the slave chip 20 is defined as $T_s$. A difference between the internal temperature $T_m$ of the master chip 10 and the internal temperature $T_s$ of the slave chip 20 is defined as a temperature difference $|T_m - T_s|$. A first threshold value of the temperature difference is defined as $T_{th1}$. A second threshold value of the temperature difference is defined as $T_{th2}$. Here, $T_{th1} > T_{th2}$.

For example, the division process control circuit 121 determines the data processing ratio between the master chip 10 and the slave chip 20 by comparison of the internal temperature $T_m$, of the master chip 10 and the internal temperature $T_s$ of the slave chip 20 and by comparison of the temperature difference $|T_m-T_s|$, which is the difference between the internal temperature $T_m$ of the master chip 10 and the internal temperature $T_s$ of the slave chip 20, and the first threshold value $T_{th1}$ or the second threshold value $T_{th2}$.

Specifically, the division process control circuit 121 determines the data processing ratio between the master chip 10 and the slave chip 20 based on Conditions 1 to 7.

(Condition 1) When $T_m>T_s$ and $|T_m-T_s|>T_{th1}$ are satisfied, the processing ratio between the master chip 10 and the slave chip 20 is set to 2:8.

(Condition 2) When $T_m>T_s$ and $|T_m-T_s|>T_{th2}$ are satisfied, the processing ratio between the master chip 10 and the slave chip 20 is set to 4:6.

(Condition 3) When $T_m>T_s$ and $|T_m-T_s|\leq T_{th2}$ are satisfied, the processing ratio between the master chip 10 and the slave chip 20 is set to 5:5.

(Condition 4) When $T_m<T_s$ and $|T_m-T_s|>T_{th1}$ are satisfied, the processing ratio between the master chip 10 and the slave chip 20 is set to 8:2.

(Condition 5) When $T_m<T_s$ and $|T_m-T_s|>T_{th2}$ are satisfied, the processing ratio between the master chip 10 and the slave chip 20 is set to 6:4.

(Condition 6) When $T_m<T_s$ and $|T_m-T_s|\leq T_{th2}$ are satisfied, the processing ratio between the master chip 10 and the slave chip 20 is set to 5:5.

(Condition 7) When $T_m=T_s$ is satisfied, the processing ratio between the master chip 10 and the slave chip 20 is set to 5:5.

Conditions 1 to 7 are only examples and the conditions may be changed depending on a device configuration or an environment. The conditions for determining the data processing ratio between the master chip 10 and the slave chip 20 may be determined in advance or may be set arbitrarily.

Figure 2:
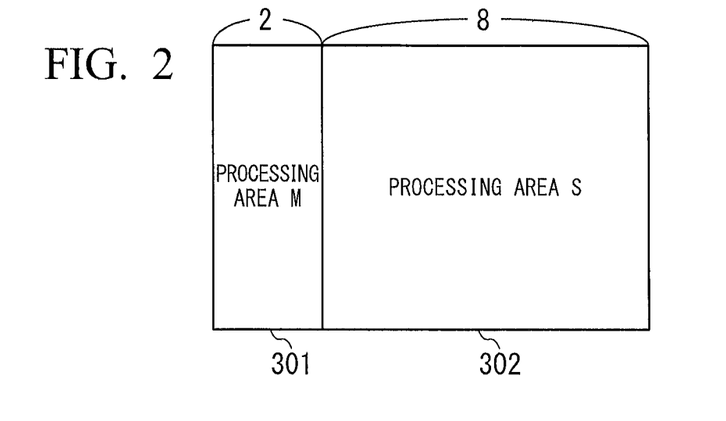
FIG. 2 is a diagram schematically illustrating master-chip data and slave-chip data when a processing ratio between a master chip and a slave chip is equal to 2:8 in the embodiment.

A method, which is performed by the imaging processing circuit 13, of dividing image data into master-chip data and slave-chip data will be described below. FIG. 2 is a diagram schematically illustrating master-chip data and slave-chip data when the processing ratio between the master chip 10 and the slave chip 20 is equal to 2:8. In the illustrated example, the imaging processing circuit 13 divides an image into master-chip data 301 (processing area M) on a left side of the image and slave-chip data 302 (processing area S) on a right side of the image. The master-chip data 301:the slave-chip data 302 is set to 2:8.

Figure 3:
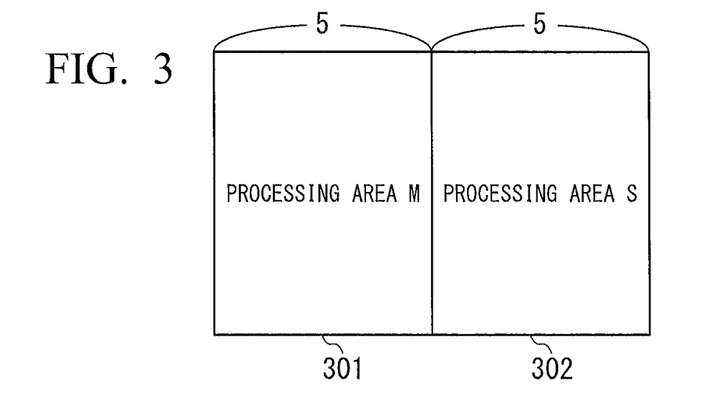
FIG. 3 is a diagram schematically illustrating master-chip data and slave-chip data when the processing ratio between the master chip and the slave chip is equal to 5:5 in the embodiment.

FIG. 3 is a diagram schematically illustrating master-chip data and slave-chip data when the processing ratio between the master chip 10 and the slave chip 20 is equal to 5:5. In the illustrated example, the imaging processing circuit 13 divides an image into master-chip data 301 on a left side of the image and slave-chip data 302 on a right side of the image. The master-chip data 301:the slave-chip data 302 is set to 5:5.

Figure 4:
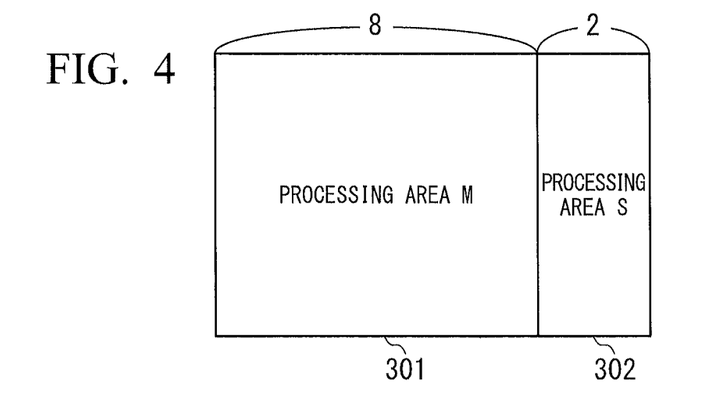
FIG. 4 is a diagram schematically illustrating master-chip data and slave-chip data when the processing ratio between the master chip and the slave chip is equal to 8:2 in the embodiment.

FIG. 4 is a diagram schematically illustrating master-chip data and slave-chip data when the processing ratio between the master chip 10 and the slave chip 20 is equal to 8:2. In the illustrated example, the imaging processing circuit 13 divides an image into master-chip data 301 on a left side of the image and slave-chip data 302 on a right side of the image. The master-chip data 301:the slave-chip data 302 is set to 8:2.

In this way, the imaging processing circuit 13 divides image data into master-chip data and slave-chip data based on the processing ratio determined by the division process control circuit 121. The imaging processing circuit 13 may divide the image data into slave-chip data on the right side of the image data and master-chip data on the left side of the image data.

Figure 5:
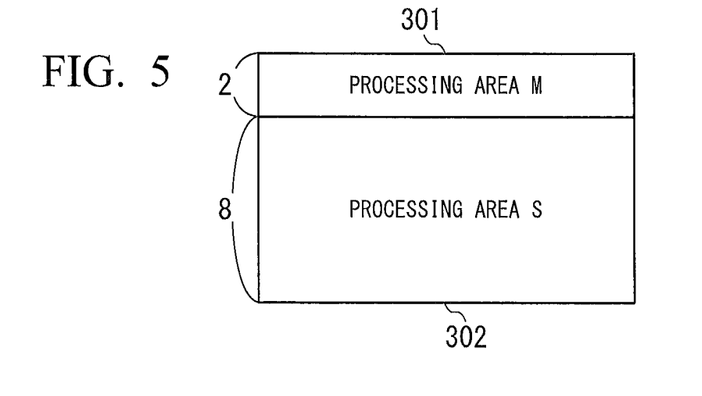
FIG. 5 is a diagram schematically illustrating master-chip data and slave-chip data when the processing ratio between the master chip and the slave chip is equal to 2:8 in the embodiment.

The imaging processing circuit 13 may vertically divide the image data instead of horizontally dividing the image data. FIG. 5 is a diagram schematically illustrating master-chip data and slave-chip data when the processing ratio between the master chip 10 and the slave chip 20 is equal to 2:8. In the illustrated example, the imaging processing circuit 13 divides an image into master-chip data 301 on an upper side of the image and slave-chip data 302 on a lower side of the image. The master-chip data 301:the slave-chip data 302 is set to 2:8.

Figure 6:
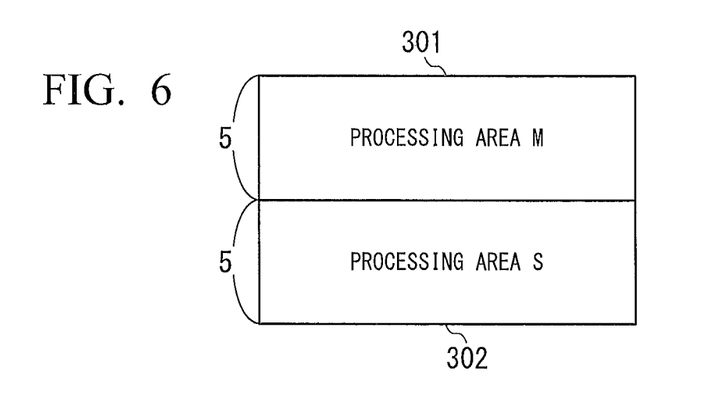
FIG. 6 is a diagram schematically illustrating master-chip data and slave-chip data when the processing ratio between the master chip and the slave chip is equal to 5:5 in the embodiment.

FIG. 6 is a diagram schematically illustrating master-chip data and slave-chip data when the processing ratio between the master chip 10 and the slave chip 20 is equal to 5:5. In the illustrated example, the imaging processing circuit 13 divides an image into master-chip data 301 on an upper side of the image and slave-chip data 302 on a lower side of the image. The master-chip data 301:the slave-chip data 302 is set to 5:5.

Figure 7:
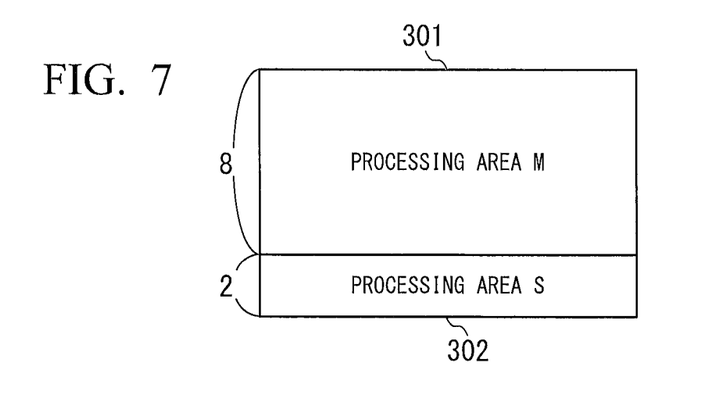
FIG. 7 is a diagram schematically illustrating master-chip data and slave-chip data when the processing ratio between the master chip and the slave chip is equal to 8:2 in the embodiment.

FIG. 7 is a diagram schematically illustrating master-chip data and slave-chip data when the processing ratio between the master chip 10 and the slave chip 20 is equal to 8:2. In the illustrated example, the imaging processing circuit 13 divides an image into master-chip data 301 on an upper side of the image and slave-chip data 302 on a lower side of the image. The master-chip data 301:the slave-chip data 302 is set to 8:2.

The imaging processing circuit 13 may divide the image data into slave-chip data on the upper side of the image data and master-chip data on the lower side of the image data. The imaging processing circuit 13 may divide the image data in any shape as long as the division is based on the processing ratio determined by the division process control circuit 121.

The operation flow of the image processor 1 will be described next. For every predetermined period while the image processor 1 is operating, the division control information generating circuit 11 acquires the internal temperature of the master chip 10 and the division control information generating circuit 21 acquires the internal temperature of the slave chip 20. The internal temperature of the master chip 10 acquired by the division control information generating circuit 11 is input to the division process control circuit 121 of the control circuit 12. The internal temperature of the slave chip 20 acquired by the division control information generating circuit 21 is input to the division process control circuit 121 of the control circuit 12 via the inter-chip communication control circuits 16 and 26 and the inter-chip communication bus 30. The predetermined period is, for example, whenever the imager 200 captures images of frames or whenever the mode of the imager 200 is changed.

Subsequently, the division process control circuit 121 determines the data processing ratio between the master chip 10 and the slave chip 20 based on the input internal temperature of the master chip 10 and the input internal temperature of the slave chip 20. The method of determining the processing ratio is the same as described above. The processing ratio determined by the division process control circuit 121 is input to the imaging processing circuit 13.

The imaging processing circuit 13 divides image data into master-chip data and slave-chip data based on the input processing ratio. The method of dividing image data into master-chip data and slave-chip data is the same as described above. The master-chip data divided by the imaging processing circuit 13 is input to the image processing circuit 15. The slave-chip data divided by the imaging processing circuit 13 is input to the image processing circuit 25 via the inter-chip communication control circuits 16 and 26 and the inter-chip communication bus 30.

The image processing circuit 15 performs image processing on the input master-chip data. The image processing circuit 25 performs image processing on the input slave-chip data. The image processing circuit 15 and the image processing circuit 25 perform the same image processing using the same parameters. The master-chip data subjected to the image processing by the image processing circuit 15 is input to the display processing circuit 14. The slave-chip data subjected to the image processing by the image processing circuit 25 is input to the display processing circuit 14 via the inter-chip communication control circuits 16 and 26 and the inter-chip communication bus 30.

The display processing circuit 14 combines the input master-chip data completely subjected to the image processing and the input slave-chip data completely subjected to the image processing and outputs the result as image data of a sheet. For example, the image data output from the display processing circuit 14 may be displayed by a display circuit which is not illustrated or may be stored in a memory circuit which is not illustrated.

As described above, according to the embodiment, the division control information generating circuit 11 acquires the internal temperature of the master chip 10. The division control information generating circuit 21 acquires the internal temperature of the slave chip 20. The division process control circuit 121 determines the processing ratio based on the internal temperature of the master chip 10 and the internal temperature of the slave chip 20. The imaging processing circuit 13 divides the image data into master-chip data and slave-chip data based on the processing ratio. The image processing circuit 15 of the master chip 10 performs image processing on the master-chip data and the image processing circuit 25 of the slave chip 20 performs image processing on the slave-chip data.

According to this configuration, the image processing can be divisionally performed by the master chip 10 and the slave chip 20 based on the internal temperature of the master chip 10 and the internal temperature of the slave chip 20. Accordingly, even when the image processing is performed using two chips (ASICs), the processing load is not biased to one chip and the image processing can be divisionally performed. That is, it is possible to prevent the internal temperature of the master chip 10 and the internal temperature of the slave chip 20 from greatly differing.

Therefore, even when an image area is divisionally subjected to image processing using a plurality of chips, it is possible to perform the image processing without stopping the operation of the device and without the image processing result varying in a single image.

In the above-mentioned embodiment, the timing at which the internal temperature of the master chip 10 and the internal temperature of the slave chip 20 are acquired is set to every predetermined period, but the present invention is not limited to this configuration. The timing at which the internal temperatures are acquired may be set to be variable, for example, by storing the temperature information of the previous time in the master chip 10 and the slave chip 20 and shortening the period in which the internal temperatures are acquired when the currently-acquired internal temperature is substantially higher than the previously-acquired internal temperature.

In the configuration of the image processor 1 illustrated in FIG. 1, the master chip 10 and the slave chip 20 have the same configuration, but the present invention is not limited to this configuration. For example, the circuit scale may be narrowed down to have only necessary functions. For example, the division process control circuit 221, the imaging processing circuit 23, or the display processing circuit 24 of the slave chip 20 may be omitted.

The division control information acquired by the division control information generating circuits 11 and 21 is not limited to the internal temperature of the master chip and the internal temperature of the slave chip 20. For example, the division control information may be an amount of data transferred through an internal bus of the master chip 10 or an amount of data transferred through an internal bus of the slave chip 20. The method of determining the data processing ratio between the master chip 10 and the slave chip 20 based on the amount of data transferred through the internal bus of the master chip 10, which is acquired by the division control information generating circuit 11, and the amount of data transferred through the internal bus of the slave chip 20, which is acquired by the division control information generating circuit 21, will be described below.

Hereinafter, the total number of times the master chip 10 performs direct memory access (DMA) transmission is defined as $D_m$. The total number of times the slave chip 20 performs DMA transmission is defined as $D_s$. A difference between the total number of times the master chip 10 performs DMA transmission $D_m$ and the total number of times the slave chip 20 performs DMA transmission $D_s$ is defined as a difference in the total number of times DMA transmission is performed $|D_m-D_s|$. A first threshold value of the difference in the total number of times DMA transmission is performed is defined as $D_{th1}$. A second threshold value of the difference in the total number of times DMA transmission is performed is defined as $D_{th2}$. Here, $D_{th1} > D_{th2}$.

For example, the division process control circuit 121 determines the data processing ratio between the master chip 10 and the slave chip 20 by comparison of the total number of times the master chip 10 performs DMA transmission $D_m$ and the total number of times the slave chip 20 performs DMA transmission $D_s$ and by comparison of the difference in the total number of times DMA transmission is performed $|D_m-D_s|$, which is the difference between the total number of times the master chip 10 performs DMA transmission $D_m$ and the total number of times the slave chip 20 performs DMA transmission $D_s$, and the first threshold value $D_{th1}$ or the second threshold value $D_{th2}$.

Specifically, the division process control circuit 121 determines the data processing ratio between the master chip 10 and the slave chip 20 based on Conditions 11 to 17.

(Condition 11) When $D_m > D_s$ and $|D_m-D_s| > D_{th1}$ are satisfied, the processing ratio between the master chip 10 and the slave chip 20 is set to 2:8.

(Condition 12) When $D_m > D_s$ and $|D_m-D_s| \geq D_{th2}$ are satisfied, the processing ratio between the master chip 10 and the slave chip 20 is set to 4:6.

(Condition 13) When $D_m > D_s$ and $|D_m-D_s| \leq D_{th2}$ are satisfied, the processing ratio between the master chip 10 and the slave chip 20 is set to 5:5.

(Condition 14) When $D_m < D_s$ and $|D_m-D_s| > D_{th1}$ are satisfied, the processing ratio between the master chip 10 and the slave chip 20 is set to 8:2.

(Condition 15) When $D_m < D_s$ and $|D_m-D_s| > D_{th2}$ are satisfied, the processing ratio between the master chip 10 and the slave chip 20 is set to 6:4.

(Condition 16) When $D_m < D_s$ and $|D_m-D_s| \leq D_{th2}$ are satisfied, the processing ratio between the master chip 10 and the slave chip 20 is set to 5:5.

(Condition 17) When $D_m=D_s$ is satisfied, the processing ratio between the master chip 10 and the slave chip 20 is set to 5:5.

Conditions 11 to 17 are only examples and the conditions may be changed depending on a device configuration or an environment. The conditions for determining the data processing ratio between the master chip 10 and the slave chip 20 may be determined in advance or may be set arbitrarily.

The division control information which is acquired by the division control information generating circuits 11 and 21 is not limited to the internal temperature of the master chip 10 or the internal temperature of the slave chip 20. For example, the division control information may be an operation mode of the imaging device 100. The method of determining the data processing ratio between the master chip 10 and the slave chip 20 based on the operation mode of the imaging device 100 which is acquired by the division control information generating circuit 11 (or the division control information generating circuit 21) will be described below.

For example, when the operation mode of the imaging device 100 is a "still image capturing mode," the division process control circuit 121 sets the processing ratio between the master chip 10 and the slave chip 20 to 10:0. That is, the division process is not performed and the image processing is performed using only the master chip 10.

For example, when the operation mode of the imaging device 100 is a "moving image capturing mode," the division process control circuit 121 sets the processing ratio between the master chip 10 and the slave chip 20 to 5:5.

For example, when the operation mode of the imaging device 100 is a "still image+moving image capturing mode (simultaneous image capturing mode)," the division process control circuit 121 sets the processing ratio between the master chip 10 and the slave chip 20 to 3:7.

The aforementioned conditions are only examples and the conditions may be changed depending on a device configuration or an environment. The conditions for determining the data processing ratio between the master chip 10 and the slave chip 20 may be determined in advance or may be set arbitrarily.

The division control information which is acquired by the division control information generating circuits 11 and 21 is not limited to the internal temperature of the master chip 10 or the internal temperature of the slave chip 20. For example, the division control information may be an internal processing time of the master chip 10 or an internal processing time of the slave chip 20. The method of determining the data processing ratio between the master chip 10 and the slave chip 20 based on the internal processing time of the master chip 10 which is acquired by the division control information generating circuit 11 and the internal processing time of the slave chip 20 which is acquired by the division control information generating circuit 21 will be described below.

Hereinafter, the number of process cycles of the master chip 10 is defined as $C_m$. The number of process cycles of the slave chip 20 is defined as $C_s$. A difference between the number of process cycles $C_m$ of the master chip 10 and the number of process cycles $C_s$ of the slave chip 20 is defined as a difference in the number of process cycles $|C_m-C_s|$. A first threshold value of the difference in the number of process cycles is defined as $C_{th1}$. A second threshold value of the difference in the number of process cycles is defined as $C_{th2}$. Here, $C_{th1}>C_{th2}$.

For example, the division process control circuit 121 determines the data processing ratio between the master chip 10 and the slave chip 20 by comparison of the number of process cycles $C_m$ of the master chip 10 and the number of process cycles $C_s$ of the slave chip 20 and by comparison of the difference in the number of process cycles $|C_m-C_s|$, which is the difference between the number of process cycles $C_m$ of the master chip 10 and the number of process cycles $C_s$ of the slave chip 20, and the first threshold value $C_{th1}$ or the second threshold value $C_{th2}$.

Specifically, the division process control circuit 121 determines the data processing ratio between the master chip 10 and the slave chip 20 based on Conditions 21 to 27.

(Condition 21) When $C_m>C_s$ and $|C_m-C_s|>C_{th1}$ are satisfied, the processing ratio between the master chip 10 and the slave chip 20 is set to 2:8.

(Condition 22) When $C_m>C_s$ and $|C_m-C_s|>C_{th2}$ are satisfied, the processing ratio between the master chip 10 and the slave chip 20 is set to 4:6.

(Condition 23) When $C_m>C_s$ and $|C_m-C_s|\leq C_{th2}$ are satisfied, the processing ratio between the master chip 10 and the slave chip 20 is set to 5:5.

(Condition 24) When $C_m<C_s$ and $|C_m-C_s|>C_{th1}$ are satisfied, the processing ratio between the master chip 10 and the slave chip 20 is set to 8:2.

(Condition 25) When $C_m<C_s$ and $|C_m-C_s|>C_{th2}$ are satisfied, the processing ratio between the master chip 10 and the slave chip 20 is set to 6:4.

(Condition 26) When $C_m<C_s$ and $|C_m-C_s|\leq C_{th2}$ are satisfied, the processing ratio between the master chip 10 and the slave chip 20 is set to 5:5.

(Condition 27) When $C_m=C_s$ is satisfied, the processing ratio between the master chip 10 and the slave chip 20 is set to 5:5.

Conditions 21 to 27 are only examples and the conditions may be changed depending on a device configuration or an environment. The conditions for determining the data processing ratio between the master chip 10 and the slave chip 20 may be determined in advance or may be set arbitrarily.

A method of changing a ratio of an operation load of the master chip 10 to an operation load of the slave chip 20 is not limited to changing of the processing ratio. For example, the operation load of the master chip 10 and the operation load of the slave chip 20 may be changed by changing an operation frequency of the master chip 10 and an operation frequency of the slave chip 20. The method of changing the operation load of the master chip 10 and the operation load of the slave chip 20 by changing the operation frequency of the master chip 10 and the operation frequency of the slave chip 20 will be described below.

Hereinafter, the internal temperature of the master chip 10 is defined as $T_m$. The internal temperature of the slave chip 20 is defined as $T_s$. A difference between the internal temperature $T_m$ of the master chip 10 and the internal temperature $T_s$ of the slave chip 20 is defined as a temperature difference $|T_m-T_s|$. A first threshold value of the temperature difference is defined as $T_{th1}$. A second threshold value of the temperature difference is defined as $T_{th2}$. Here, $T_{th1}>T_{th2}$.

For example, the division process control circuit 121 determines the operation frequency of the master chip 10 and the operation frequency of the slave chip 20 by comparison of the internal temperature $T_m$ of the master chip 10 and the internal temperature $T_s$ of the slave chip 20 and by comparison of the temperature difference $|T_m-T_s|$, which is the difference between the internal temperature $T_m$ of the master chip and the internal temperature $T_s$ of the slave chip 20, and the first threshold value $T_{th1}$ or the second threshold value $T_{th2}$.

Specifically, the division process control circuit 121 determines the operation frequency of the master chip 10 and the operation frequency of the slave chip 20 based on Conditions 31 to 37.

(Condition 31) When $T_m>T_s$ and $|T_m-T_s|>T_{th1}$ are satisfied, the operation frequency of the master chip 10:the operation frequency of the slave chip 20 is set to 162 MHz:240 MHz.

(Condition 32) When $T_m>T_s$ and $|T_m-T_s|>T_{th2}$ are satisfied, the operation frequency of the master chip 10:the operation frequency of the slave chip 20 is set to 192 MHz:216 MHz.

(Condition 33) When $T_m>T_s$ and $|T_m-T_s|\le T_{th2}$ are satisfied, the operation frequency of the master chip 10:the operation frequency of the slave chip 20 is set to 192 MHz:192 MHz.

(Condition 34) When $T_m<T_s$ and $|T_m-T_s|>T_{th1}$ are satisfied, the operation frequency of the master chip 10:the operation frequency of the slave chip 20 is set to 240 MHz: 162 MHz.

(Condition 35) When $T_m<T_s$ and $|T_m-T_s|>T_{th2}$ are satisfied, the operation frequency of the master chip 10:the operation frequency of the slave chip 20 is set to 216 MHz:192 MHz.

(Condition 36) When $T_m<T_s$ and $|T_m-T_s|\le T_{th2}$ are satisfied, the operation frequency of the master chip 10:the operation frequency of the slave chip 20 is set to 192 MHz:192 MHz.

(Condition 37) When $T_m=T_s$ is satisfied, the operation frequency of the master chip 10:the operation frequency of the slave chip 20 is set to 192 MHz:192 MHz.

Conditions 31 to 37 are only examples and the conditions may be changed depending on a device configuration or an environment. The conditions for determining the operation frequency of the master chip 10 and the operation frequency of the slave chip 20 may be determined in advance or may be set arbitrarily.

In the above-mentioned embodiment, the division control information generating circuit 11 includes the temperature sensor and acquires the internal temperature of the master chip 10 and the division control information generating circuit 21 includes the temperature sensor and acquires the internal temperature of the slave chip 20, but the present invention is not limited to this configuration. For example, it is assumed that a different dynamic random access memory (DRAM) is disposed in the vicinity of each of the master chip 10 and the slave chip 20, and each DRAM is provided with a temperature sensor. In this case, the division control information generating circuit 11 may acquire the temperature from the DRAM disposed in the vicinity of the master chip 10 and may set the acquired temperature as the internal temperature of the master chip 10. The division control information generating circuit 21 may acquire the temperature from the DRAM disposed in the vicinity of the slave chip 20 and may set the acquired temperature as the internal temperature of the slave chip 20.

In the above-mentioned embodiment, the division control information generating circuit 11 includes the temperature sensor and acquires the internal temperature of the master chip 10 and the division control information generating circuit 21 includes the temperature sensor and acquires the internal temperature of the slave chip 20, but the present invention is not limited to this configuration. For example, it is assumed that the imager 200 is disposed in the vicinity of the master chip 10 and the imager 200 is provided with a temperature sensor. In this case, the division control information generating circuit 11 of the master chip 10 disposed in the vicinity of the imager 200 may acquire the temperature from the imager 200 and may set the acquired temperature as the internal temperature of the master chip 10.

For example, it is assumed that the imager 200 is disposed in the vicinity of the slave chip 20 and the imager 200 is provided with a temperature sensor. In this case, the division control information generating circuit 21 of the slave chip 20 disposed in the vicinity of the imager 200 may acquire the temperature from the imager 200 and may set the acquired temperature as the internal temperature of the slave chip 20.

The method of changing the ratio of the operation load of the master chip 10 to the operation load of the slave chip 20 is not limited to changing of the processing ratio. For example, the operation load of the master chip 10 and the operation load of the slave chip 20 may be changed by changing a functional unit performing the image processing in the master chip 10 and a functional unit performing the image processing in the slave chip 20.

In the above-mentioned embodiment, the division control information generating circuit 11 is directly connected to the control circuit 12 and the output of the division control information generating circuit 11 is directly input to the control circuit 12, but the present invention is not limited to this configuration. For example, the division control information generating circuit 11 may be connected to the control circuit 12 via a data bus and the output of the division control information generating circuit 11 may be input to the control circuit 12 via the data bus.

In the above-mentioned embodiment, the imager 200 is connected to only the master chip 10, but the present invention is not limited to this configuration. For example, an image data dividing circuit dividing the output of the imager 200 may be provided and may divide the output of the imager 200 and input the divided output to the master chip 10 and the slave chip 20.

Figure 8:
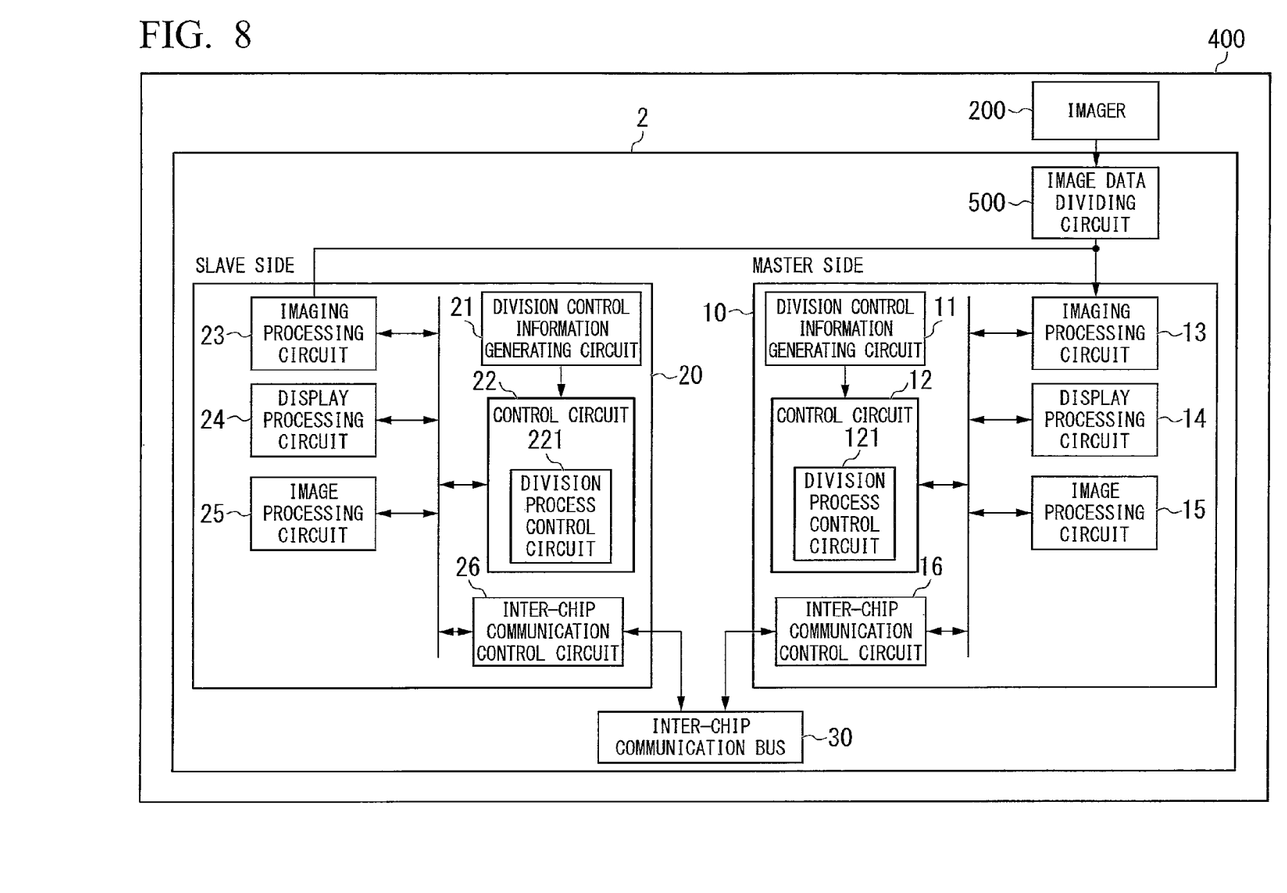
FIG. 8 is a diagram schematically illustrating a configuration of an imaging device including an image data dividing circuit.

FIG. 8 is a diagram schematically illustrating a configuration of an imaging device 400 including an image data dividing circuit. In the illustrated example, the imaging device 400 includes an imager 200 and an image processor 2. The image processor 2 includes an image data dividing circuit 500 (division circuit), a master chip 10, a slave chip 20, and an inter-chip communication bus 30. The configuration of the master chip 10 and the configuration of the slave chip 20 are the same as illustrated in FIG. 1.

The image data dividing circuit 500 divides an electrical signal output from the imager 200 into a master-chip electrical signal and a slave-chip electrical signal based on the data processing ratio between the master chip 10 and the slave chip 20, which are determined by the division process control circuit 121. The method of dividing an electrical signal into a master-chip electrical signal and a slave-chip electrical signal is the same as the method of dividing image data into master-chip data and slave-chip data, which is performed by the imaging processing circuit 13 and is illustrated in FIGS. 2 to 7.

The image data dividing circuit 500 outputs the master-chip electrical signal to the imaging processing circuit 13 of the master chip 10. The image data dividing circuit 500 outputs the slave-chip electrical signal to the imaging processing circuit 23 of the slave chip 20.

The imaging processing circuit 13 generates master-chip data based on the master-chip electrical signal. The imaging processing circuit 23 generates slave-chip data based on the slave-chip electrical signal. The subsequent processes thereof are the same as described above.

In the above-mentioned embodiment, the image processor 1 includes two ASICs such as the master chip 10 and the slave chip 20, but the present invention is not limited to this configuration. For example, the image processor 1 may include three or more ASICs. The image processor 1 may be configured such that each circuit in the above-mentioned embodiment is divisionally mounted on a wiring substrate.

All or some of the functions of the circuits of the image processor 1 may be realized by recording a program for realizing the functions on a computer-readable recording medium, reading the program recorded on the recording medium in a computer system, and executing the program therein. Here, the "computer system" includes an operating system (OS) or hardware such as peripheral devices.

Examples of the "computer-readable recording medium" include portable mediums such as a flexible disk, a magneto-optical disc, a ROM, and a CD-ROM and a memory circuit such as a hard disk built in a computer system. The "computer-readable recording medium" may include a medium that dynamically holds a program for a short time like a communication line when the program is transmitted via a network such as the Internet or a communication circuit such as a telephone circuit and a medium that temporarily holds the program for a predetermined time like a volatile memory in a computer system serving as a server or a client in that case. The program may be configured to realize some of the above-mentioned functions or may be configured to realize the above-mentioned functions by combination with a program recorded in advance in a computer system.

While embodiments of the present invention have been described above in detail with reference to the accompanying drawings, the specific configuration thereof is not limited to the aforementioned embodiments and includes various modifications in design without departing from the spirit and scope of the present invention. The present invention is not limited to the above description, and is defined by only the scope of the appended claims.

What is claimed is:

1. An image processor comprising:
a first division control information acquiring circuit configured to acquire division control information of a first chip having a first image processing circuit during a first period, the division control information of the first chip including a temperature of the first chip;
a second division control information acquiring circuit configured to acquire division control information of a second chip having a second image processing circuit during the first period, the division control information of the second chip including a temperature of the second chip;
a division process control circuit configured to determine a ratio at which a process is performed by the first image processing circuit and a ratio at which a process is performed by the second image processing circuit, based on the division control information of the first chip and the division control information of the second chip;
a division circuit configured to divide data to be subjected to image processing into first-chip data and second-chip data at the ratios determined by the division process control circuit;
the first image processing circuit configured to perform image processing on the first-chip data using predetermined parameters; and
the second image processing circuit configured to perform image processing on the second-chip data using the predetermined parameters used in the first image processing circuit, wherein,
the first division control information acquiring circuit is configured to compare the current temperature of the first chip with a previous temperature of the first chip acquired during a prior first period, and when it is determined that the current temperature of the first chip is higher than the previous temperature of the first chip, the first division control information acquiring circuit is configured to acquire the division control information of the first chip at a second period that is shorter than the first period, and
the second division control information acquiring circuit is configured to compare the current temperature of the second chip with a previous temperature of the second chip acquired during the prior first period, and when it is determined that the current temperature of the second chip is higher than the previous temperature of the second chip, the second division control information acquiring circuit is configured to acquire the division control information of the second chip at a third period that is shorter than the first period.

2. The image processor according to claim 1, further comprising a display processing circuit configured to generate the data to be subjected to image processing on which the image processing has been performed, based on the first-chip data subjected to the image processing by the first image processing circuit and the second-chip data subjected to the image processing by the second image processing circuit.

3. The image processor according to claim 1, further comprising an imaging circuit, wherein
the first period is a time interval that is required for acquiring images of a predetermined number of frames by the imaging circuit.

4. The image processor according to claim 1, further comprising an imaging circuit, wherein
the first period is a period at which an operation mode of the imaging circuit is changed.

5. The image processor according to claim 1, further comprising a communication bus that connects the first chip and the second chip together, wherein,
the division control information of the second chip acquired by the second division control information acquiring circuit is input to the first division control information acquiring circuit through the communication bus.

6. An image processor comprising:
a first division control information acquiring circuit configured to acquire division control information of a first chip having a first image processing circuit during a first period, the division control information of the first chip including a temperature of the first chip;
a second division control information acquiring circuit configured to acquire division control information of a second chip having a second image processing circuit during the first period, the division control information of the second chip including a temperature of the second chip;
a division process control circuit configured to determine a first function performed by the first image processing circuit and a second function different from the first function and performed by the second image processing circuit, based on the division control information of the first chip and the division control information of the second chip;

the first image processing circuit configured to perform image processing on first-chip data based on the first function determined by the division process control circuit; and the second image processing circuit configured to perform image processing on second-chip data based on the second function determined by the division process control circuit, wherein, the first division control information acquiring circuit is configured to compare the current temperature of the first chip with a previous temperature of the first chip acquired during the first period before, and when it is determined that the current temperature of the first chip is higher than the previous temperature of the first chip, the first division control information acquiring circuit is configured to acquire the division control information of the first chip at a second period that is shorter than the first period, and the second division control information acquiring circuit is configured to compare the current temperature of the second chip with the previous temperature of the second chip acquired during the first period before, and when it is determined that the current temperature of the second chip is higher than the previous temperature of the second chip, the second division control information acquiring circuit is configured to acquire the division control information of the second chip at a third period that is shorter than the first period.

7. The image processor according to claim 6, further comprising a display processing circuit configured to generate data to be subjected to image processing on which the image processing has been performed, based on the first-chip data subjected to the image processing by the first image processing circuit and the second-chip data subjected to the image processing by the second image processing circuit.

* * * * *